A. B. WALLEM.
LIQUID MEASURING APPARATUS.
APPLICATION FILED APR. 3, 1914.
1,218,726.
Patented Mar. 13, 1917.
3 SHEETS—SHEET 1.
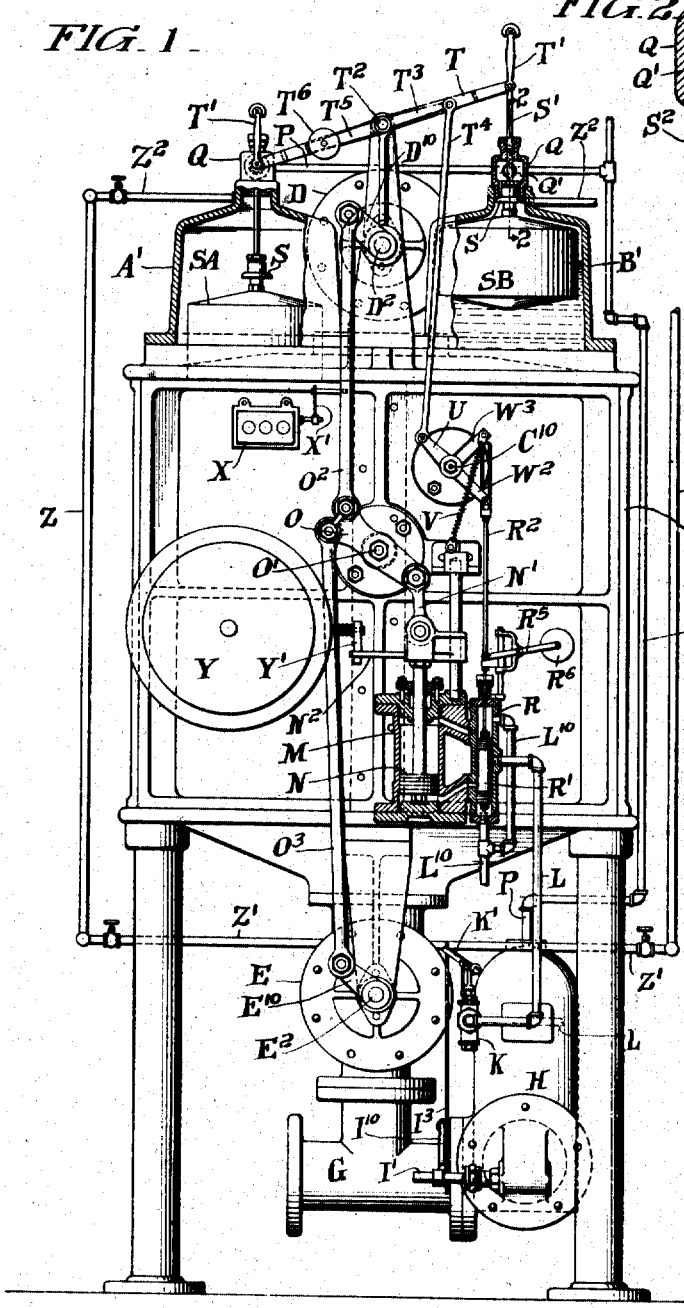
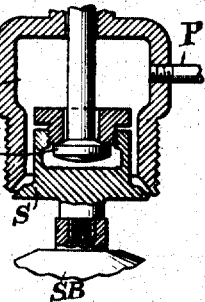

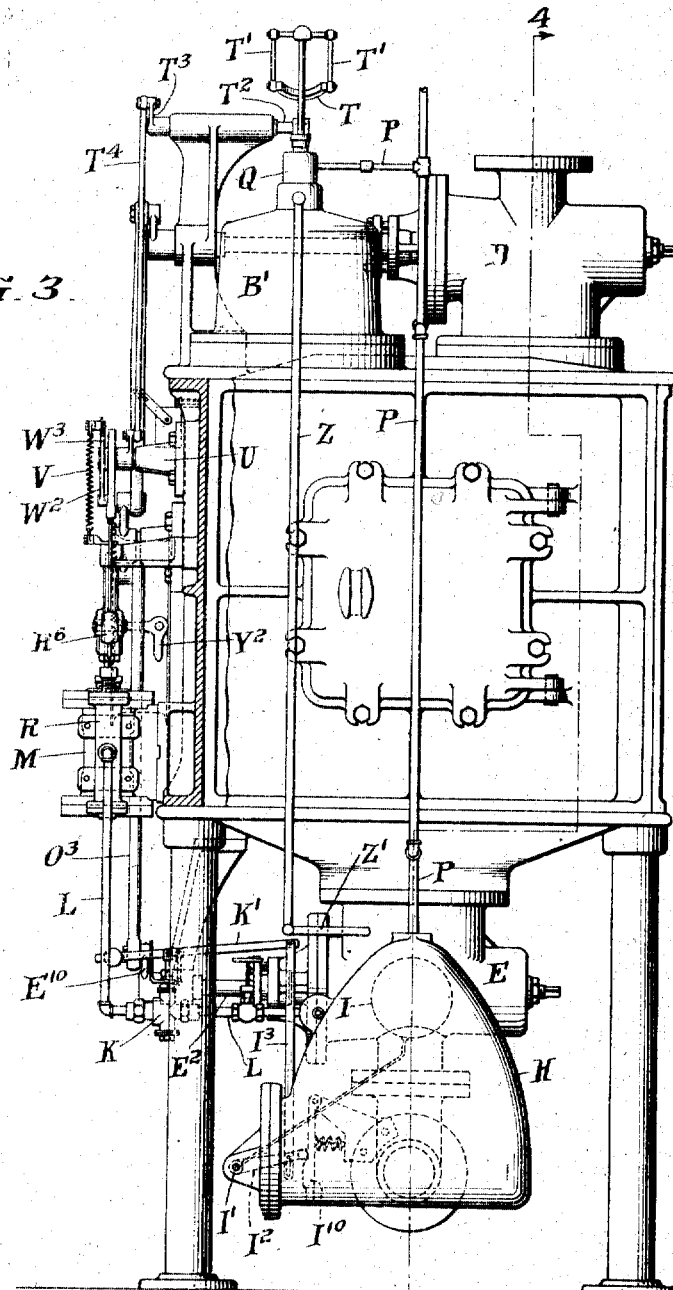

A. B. WALLEM.
LIQUID MEASURING APPARATUS.
APPLICATION FILED APR. 3, 1914.
1,218,726.
Patented Mar. 13, 1917.
3 SHEETS—SHEET 3.
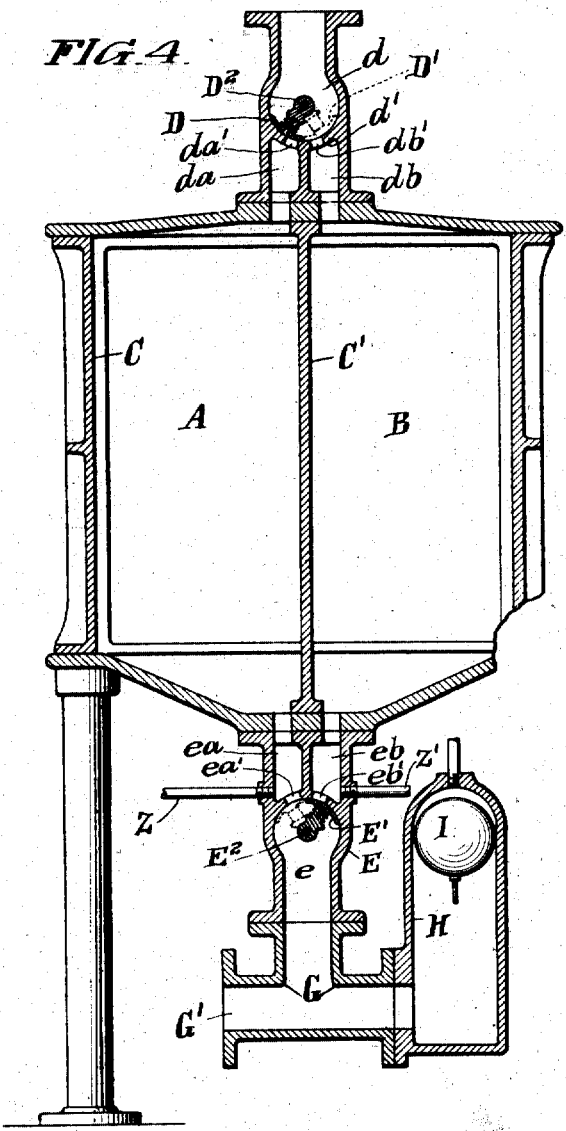
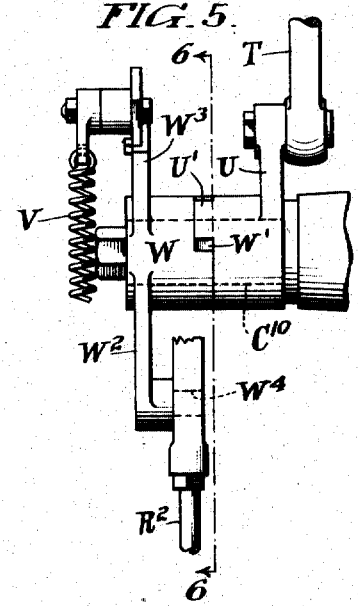
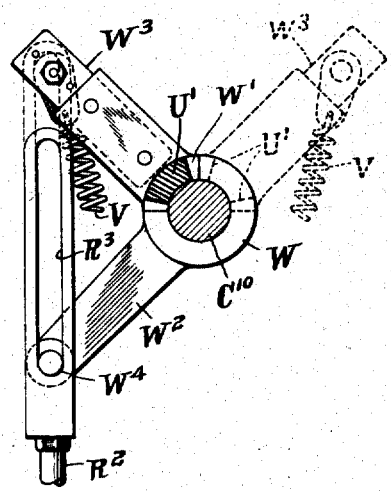

UNITED STATES PATENT OFFICE.

AXEL B. WALLEM, OF CYNWYD, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS UNDER THE FIRM-NAME OF HARRISON SAFETY BOILER WORKS.

LIQUID-MEASURING APPARATUS.

1,218,726.   Specification of Letters Patent.   Patented Mar. 13, 1917.

Application filed April 3, 1914. Serial No. 829,282.

*To all whom it may concern:*

Be it known that I, AXEL B. WALLEM, a citizen of the United States of America, residing in Cynwyd, in the county of Montgomery, in the State of Pennsylvania, have invented certain new and useful Improvements in Liquid-Measuring Apparatus, of which the following is a true and exact description, reference being had to the accompanying drawings, which form a part thereof.

My present invention relates to liquid measuring apparatus of the kind in which a measuring chamber is caused to alternately fill, and discharge, and more particularly to the type of measuring apparatus disclosed and claimed in my prior Patent No. 1,062,937, granted May 27th, 1913, in which the liquid to be measured is passed through one or the other of two measuring chambers which alternately fill and empty.

Primary objects of the present invention are to provide improved operating or controlling means for the valve mechanism by which a measuring chamber is caused to discharge and then fill up again, as the conditions of use may require the discharge of measured liquid; and to provide satisfactory means for venting or avoiding undesirable changes of pressure in the upper portion of a measuring chamber as the latter fills and empties.

The various features of novelty which characterize my invention are pointed out with particularity in the claims annexed to and forming a part of this specification. For a better understanding of the invention, however, and of the advantages possessed by it, reference should be had to the accompanying drawings and descriptive matter, in which I have illustrated and described preferred forms of apparatus embodying my invention.

Of the drawings:

Figure 1 is a front elevation of my improved measuring apparatus, with parts broken away and in section; Fig. 2 is a partial section on the line 2—2 of Fig. 1, and on a larger scale than Fig. 1; Fig. 3 is a side elevation of the apparatus shown in Fig. 1; Fig. 4 is a sectional elevation taken on the line 4—4 of Fig. 3; Fig. 5 is a partial side elevation taken similarly to Fig. 3, but on a larger scale; and Fig. 6 is a section taken on the broken line 6—6 of Fig. 5.

In the drawings, A and B represent the two measuring chambers, which, preferably as shown, though not necessarily, are in the form of the similar compartments into which a casing element C is divided by a central partition C'. As shown, the two compartments A and B are formed with inlet ports at their upper ends, and outlet ports at their lower ends. The two inlet openings communicate with corresponding outlet passages $da$ and $db$, respectively, formed in the casing of a valve D, secured to the casing element C. The casing of valve D is formed with a cylindrical partition $d'$, concave to the inlet chamber $d$ of the valve casing, and formed with ports $da'$ and $db'$, connecting the chamber $d$ with the outlet passages $da$ and $db$, respectively. The flow through the ports $da'$ and $db'$ is controlled by a rotary valve member $D'$ secured to a shaft or spindle $D^2$ journaled in and projecting through the valve casing. In Fig. 4, the valve member $D'$, when in the full line position, closes the port $da'$ while leaving the port $db'$ open, and when in the dotted line position, closes the port $db'$ while leaving the port $da'$ open. The valve member $D'$ is advantageously formed with sufficient lap so that in moving from either position into the other position it closes the port previously open before opening the previously closed port. The inlet chamber $d$ of the casing D is connected to the conduit or reservoir supplying the water to be measured.

The outlet ports from the chambers A and B, respectively, communicate with inlet passages $ea$ and $eb$, respectively, of the valve E, which may be identical in construction with the valve D, and comprises parts $e$, $ea$, $eb$, $ea'$, $eb'$, $E'$ and $E^2$, corresponding respectively to the parts $d$, $da$, $db$, $da'$, $db'$, $D'$ and $D^2$. The valve E is turned upside down with respect to the valve casing D, however, and the chambers $ea$ and $eb$ form the inlet passages of the valve E, while the chamber $e$ forms the outlet passage.

The spindles $D^2$ and $E^2$ of the valves D and E are provided externally of the corresponding valve casings with operating arms $D^{10}$ and $E^{10}$, respectively. The arms $D^{10}$ and $E^{10}$ are connected by links $O^2$ and $O^3$, respectively, to an operating lever O, fulcrumed at $O'$. The valves and operating connections are so arranged that normally the inlet port $da$ or $db$, leading to one, and the outlet port $eb$ or $ea$, leading from the other of the chambers A and B, are open, while the other two of the four ports $da$, $db$, $eb$ and $ea$, are closed, thus permitting the one chamber to fill and the other to empty. When the lever O is oscillated to permit the chamber which has been filling to empty, and the chamber which has been emptying to fill, as hereinafter explained, the valve members $D'$ and $E'$, on initial movements, close all four of the ports controlled by these members, and then on further movements, open the ports previously closed, while keeping closed the two ports previously open.

The oscillating movements of lever O are brought about by a fluid pressure motor comprising a cylinder M, in which works a piston N, having its stem connected by a link $N'$ to the lever O. The cylinder M receives the motive fluid, which may be steam or other suitable and convenient fluid under pressure, through the supply pipe L.

The passage of the pressure fluid through the supply pipe L is directly controlled, in the particular form of apparatus shown, by the primary cut off valve K, and the passage of the pressure fluid into one end or the other of the cylinder M, as well as the exhaust from the cylinder, is directly controlled by a distributing valve R.

The primary cut off valve K is operated by a float I in response to variations in the height of water level in the chamber or conduit section G into which the chambers A and B discharge. The measured water issues from the chamber G through the outlet $G'$ and may pass from the latter to a boiler feed pump or be otherwise disposed of. The float I, responsive to the rise and fall of the water level in the chamber G, is arranged as shown in a float chamber H, attached to the side of and forming an extension of the chamber G. As shown, the float I is carried by an arm secured to a shaft $I'$, which, externally of the float chamber H, carries an arm $I^2$. The latter is connected by a link $I^3$ to the operating lever $K'$ of the valve K. The pin and slot connection shown between the arm $I^2$ and the link $I^3$ permits of a limited movement of the float I without a corresponding movement of the valve K. The spring pressed cam lever $I^{10}$ insures a quick movement of the float I in either direction.

The valve R connects the pipe L to the upper or lower end of the cylinder M accordingly as the movable valve member $R'$ is in its upper or lower position. The valve also connects the upper or lower end of the cylinder M to the exhaust piping $L^{10}$ accordingly as the valve member $R'$ is in its lower or upper position.

In so far as above described my improved measuring apparatus does not differ in substance from apparatus shown in my said prior patent. In the present apparatus the distributing valve R is operated by floats responsive to the varying accumulation of water in the chambers A and B, as in my prior patent; but the present apparatus differs from that of the prior patent in the arrangement of the actuating floats and the connections through which the floats operate the distributing valve. In my present apparatus, moreover, I have provided valves operated by the floats for closing the vent pipes from the chambers A and B when the latter are filled.

In the apparatus shown herein, the chambers A and B are formed with upper portions or extensions $A'$ and $B'$ respectively, which are substantially smaller in horizontal cross section than the lower body portions of the chambers A and B. Each of these extensions is formed with an opening at its top into which is screwed a valve casing Q. Working in the chamber extensions $A'$ and $B'$ are floats SA and SB, respectively. Each of the floats SA and SB carries at its top a valve S, adapted, when the float is raised, to seat against the corresponding valve casing Q and close communication between the chamber $Q'$ thereof and the chamber $A'$ or $B'$ beneath it. As shown, each valve S is rigidly attached to the float carrying it, and has a spherical seat engaging portion, and the seats for the valves S are also spherical. Each of the floats SA and SB is loosely connected to a corresponding stem $S'$ by a ball and socket joint $S^2$ above the valve S. Each stem $S'$ is connected by links $T'$ to a lever T. The latter is carried by a rock shaft $T^2$ journaled in a bracket carried by the casing C. An arm $T^3$ secured to the shaft $T^2$ is connected by a link $T^4$ to a rocker U journaled on the stationary shaft $C^{10}$. This shaft also has journaled on it a rocker W. The hub of the rocker U is formed with a tooth $U'$ entering a recess or notch $W'$ in the hub of the rocker W. The relative dimensions (see Fig. 6) of the tooth $U'$ and recess $W'$ are such that the rocker U may have a limited angular movement without giving motion to rocker W. The latter is formed with two arms $W^2$ and $W^3$. The arm $W^2$ carries a pin $W^4$ working in a slot $R^3$ formed in the upper end of a link $R^2$ connected to the stem of the valve member $R'$. The arm $W^3$ of the rocker W is connected to one end of a spring V, which has its other end so connected to the casing C that when the rocker W is shifted from the full to the dotted line positions of Fig. 6, the line of action of the spring shifts from one side to the other of the axis of the shaft $C^{10}$ and rocker W and tends to complete the movement of the rocker W from either position into the other. As the rocker W completes its movement in either direction the pin $W^4$ engages the corresponding end of the slot $R^3$ and raises the valve member R' or lowers it, as the case may be. The valve member R' is balanced by the lever $R^5$ and counterweight $R^6$, and the rock shaft $T^2$ is balanced by the lever arm $T^5$ and counterweight $T^6$. As shown the vent valve casings Q and the float chamber H are connected to vent or equalizing piping P. When the apparatus shown is employed to measure the hot water coming from an open feed water heater, as in my said prior patent, the equalizing piping P should be connected to the steam space of the heater. When the apparatus is used to measure cold water, the casings Q need not be connected to the piping P, but may open directly to the atmosphere. The piping P should still lead upward from the float chamber H to the level of the tops of the measuring chambers, if the conditions of use are such as to create a substantial hydrostatic pressure at any time in the chamber H.

In operation, while one measuring chamber is filling and the other is emptying, both valves S are off their seats, so that there is no tendency to produce a vacuum in the chamber which is emptying or to build up an undesirable fluid pressure above the surface of the water in the chamber which is filling. As the water rises in the last mentioned chamber to the level shown in chamber B' in Fig. 1, the corresponding float (SB as shown in Fig. 1) is moved upward until the valve S carried by it, seats. In the final portion of the upward movement of the float immediately preceding the seating of the valve, the float acts through the rocker U and its tooth U' to move the rocker W in one direction or the other through the position in which the line of action of the spring V completes the movement of the rocker W into one or the other of the two positions shown in Fig. 6. The pin and slot connection between the rocker W and valve member R' results in that the member R' is shifted by the motion of the rocker W brought about by the spring V and follows instantaneously after the shifting of the spring V from one side to the other of the shaft $C^{10}$. The lost motion between the rockers U and W is such that the rocker U need not share in the quick valve closing movement of the rocker W. The lost motion between each float and its stem also permits the lowering of the float in the filled chamber, as the latter begins to empty, sufficiently to unseat the corresponding valve S and thus avoid any vacuum formation, without disturbing the valve member R'. The shifting of the valve member R' causes the piston N in the cylinder M to be moved and the valves D and E thereby shifted, if or when the valve K does not prevent the flow of the motive fluid to the valve R through the pipe L.

When the apparatus is used under one condition of operation, the arrangement should be such that when either measuring chamber A or B, after being filled, is opened to the chamber G, the filled measuring chamber will empty, and the emptied chamber will fill, in less time than is required for the water passing out of the emptying chamber, to flow through the chamber G. In other words, when the chamber G supplies a boiler feed pump, for instance, the apparatus should be so designed that either chamber A or B will fill or empty in less time than that required by the boiler feed pump, working at its maximum capacity, to pump out of the receptacle G a quantity of water equal to that which either chamber A or B will hold. In consequence, as either measuring chamber begins to discharge, the water level in the receptacle G and float chamber H rises and the float I then closes the valve K. When the one chamber has been emptied and the other filled the valve member R' is moved so as to permit the motive fluid to move the piston N to the other end of the cylinder M. But such movement of the piston N will not occur until the level of the liquid in float chamber H falls sufficiently to allow the valve K to open, thus admitting the motive fluid to the cylinder M. When therefore the withdrawal of water from the receptacle G sufficiently lowers the water level in the latter, the float I falls and opens the valve K. Under this condition of operation the filling chamber will fill in less time than the emptying chamber empties and the valve K is needed to prevent the shifting of the valves D and E before the emptying chamber is entirely empty.

When the apparatus is used to measure water of condensation discharging into a hot well, for instance, the flow through the chamber G may well be unrestricted so that if the ports $ea'$ and $eb'$ are larger than the ports $da'$ and $db'$, respectively, the emptying chamber may empty in less time than the filling chamber fills. In this case the valve K will always be open and hence is unnecessary and may be dispensed with.

Inasmuch as the horizontal cross section of the chamber extensions A' and B' is substantially less than that of the body portions of the chambers A and B, and as these chamber extensions are substantially filled moreover by the floats SA and SB, an appreciable difference in the height of water level in a chamber extension A' or B' at the instant at which the valves D and E shift will make but an insignificant percentage change in the amount of water in the chamber which then begins to empty. The positive closing of the vent opening of the filled chamber prevents liquid from passing out through the vent opening and any variation in the effective capacity of the measuring chamber from this cause. As the operating connections between the valve controlling mechanism and the floats SA and SB pass through the vent openings in the tops of the chambers A and B, no stuffing box provisions for these floats need be made in the walls of the measuring chambers proper. Gage glasses Z are connected at their lower ends by pipes Z' one to the passage ea and the other to the passage eb of the valve E, and are connected at their upper ends to the corresponding vent valve casings Q by pipes Z².

The oscillating movements of the lever O and therefore the number of times the two chambers A and B fill and empty, are counted by means of a counting train X having its operating lever X' connected to the link O². To obtain a graphic record of the number of times the measuring chambers fill and empty, I may provide a clock driven recording device Y having its actuating member Y' engaged and operated by the pin N² connected to the piston N on each up and down movement of the latter.

While in accordance with the provisions of the statutes I have illustrated and described the best forms of my invention now known to me, it will be apparent to those skilled in the art that changes may be made in the forms of apparatus disclosed without departing from the spirit of my invention, and that under some conditions certain features of my invention may be used with advantage without a corresponding use of other features.

Having now described my invention, what I claim as new and desire to secure by Letters Patent, is:

1. A liquid measuring device comprising two measuring chambers each formed with a vent port at its top, a valve mechanism controlling the admission to and discharge from said chambers, and means for automatically shifting said mechanism to cause said chambers to fill and empty alternately, comprising a float in each chamber, an operating connection to each float extending through the corresponding vent port, and a valve carried by each float for closing the corresponding vent port as the float rises to its upper position.

2. A liquid measuring device comprising two measuring chambers, a valve mechanism controlling the admission to, and discharge from said chambers, and means for automatically shifting said mechanism to cause said chambers to fill and empty alternately, said means comprising fluid pressure valve shifting mechanism, a controlling valve therefor, an actuating member for said valve, said member being shiftable back and forth between two operative positions, means acting on said member to cause the latter to complete a movement from one position to the other after an initial portion of said movement has been made, and means responsive to the distribution of liquid in the two measuring chambers for starting said movement in one direction or the other as one or the other of the two chambers becomes filled and the other empty.

3. A liquid measuring device comprising two measuring chambers each formed with a vent port at its top, a valve mechanism controlling the admission to and discharge from said chambers, and means for automatically shifting said mechanism to cause said chambers to fill and empty alternately comprising a float in each chamber, valves moved by the floats for alternately closing each vent port as the corresponding float rises to its upper position, a member through which said valve mechanism is actuated, means including an operating connection to each float extending through a corresponding vent port connecting said floats for actuating said member said last means being so connected to said member as to permit an initial movement of each float out of its upper position without producing a corresponding movement of said member.

4. A liquid measuring device comprising two measuring chambers, a valve mechanism controlling the admission to and discharge from said chambers, and means for automatically shifting said mechanism to cause said chambers to fill and empty alternately, said means comprising a rocker shiftable back and forth between two positions, a device connected thereto and acting to cause the rocker to make the final portion of a movement in either direction after the first portion of such a movement is brought about, a second rocker coaxial with the first mentioned rocker and connected thereto by means permitting a limited angular movement of said second rocker relative to the other but causing the motion of said second rocker to be transmitted to the other when the movement of said second rocker exceeds said limited movement and float actuated means responsive to the distribution of liquid in said chambers for oscillating said second rocker on predetermined changes in the said distribution.

5. In a liquid measuring device having a measuring chamber formed with a vent port at its top, a valve mechanism for causing said chamber to alternately fill and empty, controlling means therefor including a float located in said chamber and an operating connection extending through said port through which said float actuates said mechanism to interrupt the supply of liquid to said chamber on a predetermined rise in the liquid level therein, and a valve moved by said float to close said port on said predetermined rise in liquid level in said chamber.

6. A liquid measuring device comprising a measuring chamber having a body portion and an upper portion of smaller horizontal cross section than said body portion, a valve mechanism for causing said chamber to alternately fill and empty, and controlling means for said mechanism including a float movable up and down in said upper portion and actuated by a rise in liquid level to a predetermined height in said upper portion to cause the supply of liquid to said chamber to be interrupted.

7. A liquid measuring device comprising two measuring chambers each having a body portion and an upper portion of smaller horizontal cross section than said body portion, a float located in each of said upper portions and but slightly smaller in horizontal cross section than the said portion in which it is located, and a valve mechanism controlled by said floats for causing said chambers to alternately fill and empty and actuated by each float when the liquid level rises to a predetermined height in the upper portion of the chamber in which the float is located to interrupt the supply of liquid to that chamber.

8. A liquid measuring device comprising two measuring chambers each having a body portion and an upper portion of smaller horizontal cross section than said body member with a vent port in the top of said extensions, a float located in each of said extensions, and an operating connection thereto extending through said vent port, and a valve connected to each float for closing the corresponding vent port when the float rises to its upper position and a valve mechanism controlled by said floats for causing the chambers to fill and empty alternately.

AXEL B. WALLEM.

Witnesses:
 ROBERT G. CLIFTON,
 WILLIAM F. EHLERS.